US009286740B2

(12) United States Patent
Kamps et al.

(10) Patent No.: US 9,286,740 B2
(45) Date of Patent: Mar. 15, 2016

(54) METHOD FOR DISPLAYING INFORMATION

(75) Inventors: Rolf Kamps, Wuppertal (DE); Ulrich Müller, Velbert (DE); Andreas Van Den Boom, Essen (DE)

(73) Assignee: HUF HULSBECK & FURST GMBH & CO. KG (DE)

( * ) Notice: Subject to any disclaimer, the term of this patent is extended or adjusted under 35 U.S.C. 154(b) by 477 days.

(21) Appl. No.: 12/747,432

(22) PCT Filed: Dec. 4, 2008

(86) PCT No.: PCT/EP2008/066817

§ 371 (c)(1),
(2), (4) Date: Sep. 13, 2010

(87) PCT Pub. No.: WO2009/074509

PCT Pub. Date: Jun. 18, 2009

(65) Prior Publication Data

US 2011/0134835 A1 Jun. 9, 2011

(30) Foreign Application Priority Data

Dec. 13, 2007 (DE) ......................... 10 2007 060 609

(51) Int. Cl.
*H04W 4/00* (2009.01)
*G07C 5/08* (2006.01)
*G07C 5/00* (2006.01)

(52) U.S. Cl.
CPC .............. *G07C 5/0858* (2013.01); *G07C 5/008* (2013.01)

(58) Field of Classification Search
CPC ...................................................... H04W 80/04
USPC .......... 370/328, 329; 340/5.2, 5.21, 5.28, 5.3, 340/5.31, 5.33, 5.54, 5.61, 5.64, 5.72; 455/422.1, 524–525, 450, 464, 509; 701/2, 70
See application file for complete search history.

(56) References Cited

U.S. PATENT DOCUMENTS 5,963,129 A * 10/1999 Warner .................. G08G 1/205 340/10.42
6,094,609 A 7/2000 Arjomand
(Continued)

FOREIGN PATENT DOCUMENTS

DE 19917817 10/2000
DE 10039766 2/2002
(Continued)

OTHER PUBLICATIONS

International Search Report; PCT/EP2008/066817; Mar. 11, 2009.

*Primary Examiner* — Asad Nawaz
*Assistant Examiner* — Berhanu Belete
(74) *Attorney, Agent, or Firm* — Cantor Colburn LLP

(57) ABSTRACT

The invention relates to a method for displaying information, using a mobile identification provider (10) and an independent display unit (20), wherein said mobile identification provider (10) serves for an activation of a security system, said mobile identification provider (10) has an electronic unit (11), and said electronic unit (11) is used for data communication (30) with a vehicle-side part, vehicle-side information is transmitted from the vehicle-side part to the electronic unit (11) via the data communication (30), said vehicle-side information is stored in a data memory (12), said electronic unit (11) communicates with the independent display unit (20) via a communication connection (40), and said vehicle-side information is transmitted to said independent display unit (20) via said communication connection (40) and displayed thereon.

23 Claims, 3 Drawing Sheets

(56) References Cited

U.S. PATENT DOCUMENTS 6,285,931 B1 * 9/2001 Hattori .................. G07C 5/008 340/426.15
6,370,454 B1 * 4/2002 Moore ................ G06Q 10/109 340/438
6,552,649 B1 * 4/2003 Okada ................ B60R 25/2036 307/10.1
6,587,768 B2 * 7/2003 Chene et al. ................. 701/33.2
6,608,553 B2 * 8/2003 Isobe .................... B60R 25/102 340/426.1
6,654,673 B2 * 11/2003 Ferguson ........... G05B 23/0213 701/31.4
6,744,352 B2 * 6/2004 Lesesky et al. ............... 340/431
6,832,206 B1 * 12/2004 Chelnik ................ G07B 15/02 235/31 R
7,212,989 B1 * 5/2007 Taniguchi .............. G06Q 20/20 340/905
7,286,040 B2 * 10/2007 Karabinis .............. G01D 21/00 340/10.1
7,401,741 B2 * 7/2008 Thayer ................ G07C 5/0858 235/451
7,409,275 B2 * 8/2008 Sakurai .................. G07C 5/008 340/438
7,696,864 B2 * 4/2010 Dillon .................... B60Q 1/503 340/468
7,768,377 B2 * 8/2010 Brey ...................... B60R 25/04 307/10.5
7,778,743 B2 * 8/2010 Arie ...................... B60R 25/246 307/10.7
7,822,514 B1 * 10/2010 Erickson ........................... 701/2
7,839,262 B2 * 11/2010 Shinada .......................... 340/5.2
7,881,838 B2 * 2/2011 Larschan ............... G06Q 10/06 348/148
7,999,654 B2 * 8/2011 Taki .................... B60R 25/2009 307/10.3
2001/0013833 A1 * 8/2001 Chen ..................... B60R 25/104 340/4.32
2003/0003777 A1 * 1/2003 Lesesky .............. B60R 16/0315 439/34
2003/0033061 A1 * 2/2003 Chen ...................... G07C 5/006 701/33.4
2003/0095030 A1 * 5/2003 Greenwood ............ B60R 25/24 340/5.61
2003/0152088 A1 * 8/2003 Kominami ........... B60N 2/0248 370/401
2004/0068555 A1 * 4/2004 Satou ..................... G07C 5/008 709/219
2004/0204822 A1 * 10/2004 Kohno ................... G01C 21/26 701/454
2004/0230348 A1 * 11/2004 Mann .................. B60R 25/2081 701/1
2006/0190153 A1 * 8/2006 Kang ....................... G07C 3/00 701/50
2006/0192650 A1 * 8/2006 Shinada .................. B60R 25/24 340/5.2
2006/0229014 A1 * 10/2006 Harada ............... H04M 1/7253 455/41.2
2007/0152801 A1 * 7/2007 Hammes ............. B60R 25/2009 340/426.18
2007/0267473 A1 * 11/2007 Thayer ................... G07C 5/008 235/375
2008/0066186 A1 * 3/2008 Hammes ............. B60R 25/2018 726/27
2008/0086240 A1 * 4/2008 Breed .................... G07C 5/008 701/1
2009/0212905 A1 * 8/2009 Batz ..................... B60G 17/017 340/5.54
2011/0004384 A1 * 1/2011 Erickson ................. B60R 25/00 701/70

FOREIGN PATENT DOCUMENTS

EP 1484463 12/2004
EP 1696392 8/2006
WO 2004077721 9/2004
WO 2005073926 8/2005

* cited by examiner

METHOD FOR DISPLAYING INFORMATION

TECHNICAL FIELD

The invention concerns a method for display of information. The invention also concerns a system for display of information, as well as a mobile identification transmitter.

BACKGROUND

Modern motor vehicles often have a number of electronic systems, like speedometer, engine management or safety systems. These electronic systems are generally connected to each other by a bus system, for example, a CAN-bus, and are monitored by a computer unit within the vehicle. It is therefore possible for a user sitting in the vehicle to have a variety of information displayed from the individual electronic systems. However, it turned out to be a drawback that this information cannot be transmitted or only transmitted very awkwardly from the vehicle to an electronic data processing element. For example, during a visit to the shop, an employee must often write out the information by hand and compare it with tables, in order to be able to make a statement concerning the present status of the vehicle, especially the electronics systems.

Mobile identification transmitters, also called ID transmitters below, are used in numerous applications in vehicles to increase operator comfort and to increase theft security. Infrared systems or radio systems are ordinarily used, in which the authorized user operates a key on the ID transmitter, in order to transmit a signal to the base station, for example, a transmitter and receiving unit provided in the vehicle, to lock and/or unlock the vehicle lock. After corresponding activation of the ID transmitter, which is also known as an electronic key, data communication occurs between the ID transmitter and the lock, in which a code is exchanged, preferably via electromagnetic waves, so that after a positive evaluation of the code, for example, the doors, trunk lid of the vehicle can be remotely unlocked and/or locked and additional functions can be initiated.

BRIEF SUMMARY

The present invention devises a method for display of information that overcomes the mentioned drawbacks, and especially permits display of information of a vehicle.

A method is proposed for display of information. The invention also provides a system with a mobile identification transmitter and an independent display unit. The invention further provides a mobile identification transmitter. Features and details described in conjunction with the method according to the invention also apply in conjunction with the system according to the invention and the mobile identification transmitter and vice versa.

The invention more particularly provides a method for display of information with a mobile identification transmitter and an independent display unit, in which the mobile identification transmitter is used to activate a security system of a vehicle, the mobile identification transmitter has an electronic unit and the electronic unit is used for data communication with a part in the vehicle, vehicle information being transmitted from the vehicle part to the electronic unit via data communication, the vehicle information is stored in a data memory, the electronic unit communicates with the independent display unit via a communication connection and the vehicle information is transmitted via the communication connection to the independent display unit and displayed there.

The main idea of the invention is based on the fact that the information occurring in the vehicle is stored on the mobile identification transmitter. In conjunction with this, it is possible for the user to display the vehicle information on an independent display unit that is not part of the mobile identification transmitter. To do this, the electronic unit transmits the vehicle information to be displayed via the communication connection. It is therefore possible at any time for the user to display the vehicle information on any display unit and check it. This method is particularly advantageous in order to monitor a number of vehicles, as is the case at a car rental agency. Only transmission of the vehicle information according to the invention to the display unit is necessary in order to monitor the status of individual vehicles.

In the context of an advantageous embodiment of the method according to the invention, it is proposed that the mobile identification transmitter transmits a query sequence, in which case the display unit receives the query sequence and transmits a response sequence to make the communication connection. A transmission format for the vehicle information can be transmitted in the response sequence. In the context of this alternating question and answer sequence, the requirements to display the vehicle information on the independent display unit are created. The query sequence can lead to execution of the computer program on the display unit. This computer program ensures that the vehicle information sent by the mobile ID transmitter is received by the display unit and displayed accordingly. In addition, different communication interfaces of a display unit can be addressed in parallel by the query sequence. From this number of possibilities, the display unit chooses a corresponding transmission format with the interface setup for it and transmits the corresponding transmission format in the response sequence to the mobile ID transmitter. It is then possible for anyone to adapt the vehicle information to the desired transmission format and transmit to the display unit. This has the advantage that a user of the method according to the invention can use any display unit available to him, in order to display the vehicle information. The user does not have to rely on preinstalled display units, especially those marketed by the manufacturer of the vehicle.

Since a user can access a number of display units in order to display the vehicle information, another advantageous variant of the method according to the invention is characterized by the fact that, after transmission of the query sequence, the method also comprises the following steps:

- a number of types of independent display units receive a query sequence and send a response sequence,
- the mobile identification transmitter receives a number of response sequences,
- the mobile identification transmitter selects an independent display unit by means of a priority list, and
- the mobile identification transmitter transmits the vehicle information to the selected independent display unit.

The advantage of this variant is that it can be defined beforehand where the set information is to be displayed. For example a display unit can be chosen depending on the type of vehicle information. On the other hand, it is also possible to mark a number of display units of the same type with an internal code. The identification transmitter according to the invention is then capable of selecting the display unit so marked and transmitting the vehicle information only to this display unit. This type of method according to the invention has proven to be particularly advantageous in the context of management of large fleets of vehicles. The mobile ID transmitters for the different vehicles can be issued at a central vehicle location and later collected again. Depending on different vehicle classes, it is possible to display the vehicle information on pre-established display units. Thus, a simple comparison of individual vehicle classes, like trucks or passenger cars, is possible in the central vehicle location.

In contrast to the variant described above, another variant of the method according to the invention is characterized by the fact that the independent display unit transmits a query sequence, in which the mobile ID transmitter receives the query sequence and sends a response sequence. In contrast to the previous method, the query sequence is not sent by the mobile identification transmitter, but by the display unit. The mobile identification transmitter responds after receipt of the query sequence and can then transmit a number of transmission formats, among which the display unit can choose. As an alternative, the display unit, in the context of the query sequence, can already transmit the desired transmission format for the vehicle information.

Another advantageous variant of the method according to the invention is characterized by the fact that a variety of vehicle information is transmitted via data communication from a number of vehicle parts to the electronic unit, especially that the mobile identification transmitter, depending on the type of independent display unit, transmits different vehicle information by means of the communication connection. According to the requirement, it is possible for the mobile ID transmitter to store or transmit only some vehicle information or most of it. Very different vehicle parts can therefore also be monitored by means of the method according to the invention.

In particular, it is possible to monitor at least one of the following vehicle parts: a lock system, an odometer, an error memory, a vehicle bus system, a GPS system, a heater, especially a parking heater, a parking system, a vehicle or engine management system. Each of the listed vehicle parts sends information concerning its current status to the central vehicle control. By making contact between the mobile identification transmitter and the vehicle, especially in conjunction with activation of the security system, this vehicle information is transmitted to the electronic unit and stored there. It is therefore ensured that the vehicle information is only transmitted to the mobile identification transmitter, if it has been clearly defined beforehand. After checking authorization, the vehicle information is made available to the mobile identification transmitter. In conjunction with transmission, it is possible for the user to seek out any display unit and have the state of the vehicle displayed there. Vehicle mileage, tank content, maintenance content or content of an error memory can be displayed on the display unit. It is also conceivable that the user can have the information called up by an Internet-capable computer and place the Internet-capable computer independently in connection with a shop and transmit the vehicle information. Any inspection dates and service materials can thus be ordered beforehand.

In order to transmit the query sequence, an activation element can be arranged on the identification transmitter. It is therefore possible for a user of the method according to the invention to carry out transmission of the vehicle information only when this is desired. By triggering the activation element, the correspondingly formatted query sequence is sent to the display unit, on which the vehicle information is then displayed according to the method of the invention.

In an advantageous variant of the method according to the invention, the display unit stores and/or processes the vehicle information. The vehicle information can then be evaluated with mathematical methods and/or compared with a reference value. As an alternative, it is also possible to compare the vehicle information with a reference interval. The limits of the reference interval then correspond to stipulated parameters, within which the vehicle information should lie. For example, the engine temperature could be checked whether it surpasses or falls short of a stipulated limit value. If surpassing of the limits of the reference interval is present, the display unit can display a warning signal. It is thus easily possible for a user to recognize any deviations and/or errors of the vehicle in a timely fashion and issue a corresponding repair order.

Another variant of the method according to the invention is characterized by the fact that the display unit sends an information sequence to the mobile identification transmitter. In the context of the information sequence, instructions are transmitted from the display unit to the mobile identification transmitter. The information sequence can also contain a computer program, which is processed on the mobile identification transmitter. The computer program can be loaded in the electronic unit and processed and/or executed there. It is also possible for the information sequence to be transmitted from the mobile identification transmitter to a data processing system of the vehicle. In this case, the mobile identification transmitter acts as a data memory. The information sequence so transmitted can be integrated and/or processed in the data processing system of the vehicle. Thus, it has proven advantageous, if the information sequence includes limit values and/or instructions that can be processed, for example, in the engine management of the vehicle. It is possible on this account to adapt a vehicle at any time to changing external conditions, for example, summer or winter. Through this embodiment of the method according to the invention not only values and information can be transmitted from the vehicle to the display unit, but also information in the opposite direction. The information sequence can execute processing of the vehicle information in the data processing system of the vehicle before transmission to the mobile identification transmitter. Because of this, the vehicle information can already be compared beforehand with reference values and reference intervals. Only the vehicle information that deviates from or lies outside the reference values/intervals is then sent to the mobile identification transmitter.

The invention provides a computer program product for execution of the method, in which the process steps are integrated in a program stored in the computer program product.

The invention provides, in another embodiment, a system for display of information with a mobile identification transmitter and an independent display unit, in which the mobile identification transmitter is used for activation of a security system of a vehicle, the mobile identification transmitter has an electronic unit and the electronic unit is used for data communication with a vehicle part, the vehicle information can be transmitted from the vehicle part to the electronic unit via data communication and the vehicle information can be stored in the data memory, the electronic unit communicates with the independent display unit via a communication connection, and the vehicle information can be transferred to the independent display unit via the communication connection and displayed there. The features mentioned in conjunction with the system according to the invention also apply in conjunction with the method according to the invention and vice versa.

The system according to the invention is characterized by the fact that the mobile identification transmitter communicates with an independent display unit. The display unit consequently does not need to be delivered by the manufacturer of the vehicle or adapted in some other way beforehand to communication with the mobile identification transmitter. It is only necessary that a communication connection can be made between the mobile identification transmitter and the display unit and the vehicle information can be transmitted from the mobile identification transmitter to the display unit. Advantageously, the display unit is at least a part of the following elements: a personal digital assistant (PDA), a notebook, a personal computer (PC), a radio, a navigation system or a dashboard display.

In order to produce a communication connection between the mobile ID transmitter and the display unit, the former can have a communications device. This communication device is a transmitter/receiver unit designed for uni- or bidirectional transmission of the vehicle information. In particular, the transmitting/receiving unit can be the transponder. The identification transmitter according to the invention is primarily used for activation of a security system of the vehicle. This type of mobile identification transmitter has a transponder that is used to transmit a code to the security system. As an alternative, the transponder serves to modulate an electromagnetic wave emitted by the security system, so that distinct identification of the mobile identification transmitter is possible. By using this transponder as a communication device, the components can be saved and the method according to the invention can be implemented inexpensively, the electronic unit can store the vehicle information and produce the communication connection to the display unit by transmitting a correspondingly modulated electromagnetic wave by means of the transponder. The latter can have a communication element, in which the communication element is used to make a communication connection to the mobile identification transmitter. The communication element can be a transmitter/receiver unit equipped similar to the communication device.

The communication connection between the display unit and the mobile identification transmitter permits uni- and/or bidirectional exchange of vehicle information. It has then proven advantageous, if the communication device and/or the communication element has one of the following technologies: Bluetooth, infrared data association (IrDA), ZigBee, Bluejacking, Bluesnarfing, Bluebugging, Near Field Communication (NFC), Wireless Local Area Network (WLAN; IEEE 802.11), WiMAX, Wibree, FireWire (IEEE 1394), USB (Universal Serial Bus), HDMI (High Definition Multimedia Interface), Unilink, ATA/ATAPI (Advanced Technology Attachment with Packet Interface), IEEE 488, IEEE 1284 or capacitive data transmission. Most of the mentioned technologies permit a wireless communication connection to be made between the two elements of the system. Such types of wireless communication connections have proven to be particularly user-friendly, since no additional aids, like cables, are necessary, in order to execute the method according to the invention on the system according to the invention.

In an advantageous embodiment, it is proposed that the display unit uses at least one of the following devices: a light-emitting diode (LED), an organic light-emitting diode (OLED), a liquid crystal display (LCD), a plasma screen, a cathode ray tube, a surface conduction electron emitter display (SED) or a field emission screen (FED). A liquid crystal display is based on the use of special liquid crystals, which can influence the direction of polarization of light, in order to depict characters, symbols or images. Such LCD screens include a number of segments, in which orientation of liquid crystals can be individually controlled with an electrical field. An SED screen has a similar functionality to a cathode ray tube. But instead of an individual electronic emitter, an SED screen uses an emitter in each individual subpixel. An advantage of this type of screen is the rapid reaction time and obtainable contrast.

In the context of the invention disclosed here, it has proven advantageous that the described system is operated according to one of the methods described above.

The invention further provides a mobile identification transmitter for a security system of a vehicle with an electronic unit and a data memory, in which the electronic unit is used for data communication with a vehicle part, the vehicle information can be transmitted via data communication from the vehicle part to the electronic unit. It is proposed according to the invention that the vehicle information can be stored in the data memory, the electronic unit communicates with an independent display unit via a communication connection, in which the vehicle information can be transmitted to the independent display unit and displayed there via the communication connection.

BRIEF DESCRIPTION OF THE DRAWINGS

Further advantageous variants of the present invention and the method are apparent from the corresponding dependent claims and the following description. With reference to the drawings, several practical examples of the invention are described in detail. Features and details that are described in conjunction with the method according to the invention then naturally also apply in conjunction with the system according to the invention and the mobile identification transmitter and vice versa. In this case, the features mentioned in the claims and description can be essential to the invention individually or in any combination. In the drawings:

DETAILED DESCRIPTION

Figure 1:
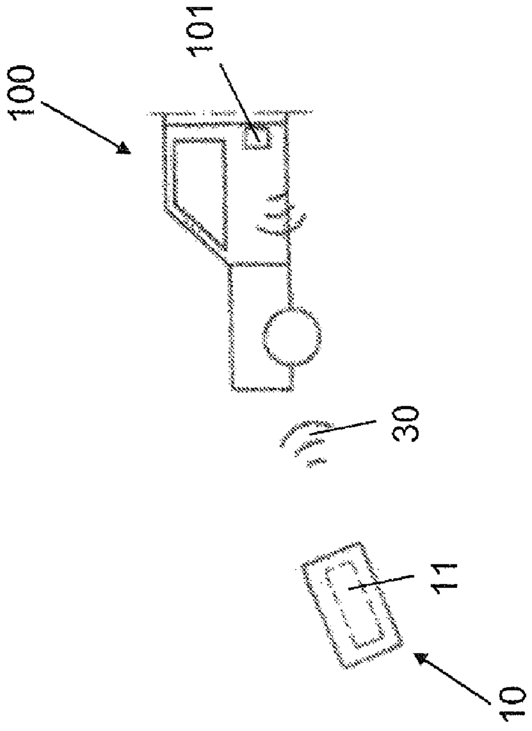
FIG. 1 shows a schematic view of a mobile identification transmitter, which is in data communication with a locking device of a vehicle.

FIG. 1 schematically depicts a mobile identification transmitter 10, which is in communication with a security system 101 of a vehicle 100. The mobile identification transmitter 10 is used to execute predefined functions on vehicle 100. This is especially locking and/or unlocking of the closure system in the vehicle. For this system, the mobile identification transmitter 10 transmits a code to the security system 101. As shown in FIG. 1, this can occur via a wireless data communication 30. According to the invention, vehicle information is also sent via wireless data communication 30 to the mobile identification transmitter 10. Modern vehicles generally have a number of electronic systems that monitor the functions of vehicle 100. These can be an odometer, a GPS system, an ABS system, an air conditioner or an engine management system. All the mentioned vehicle systems each determine vehicle information, which provide a conclusion concerning the status of vehicle 100. Sometimes it is possible to have the user of vehicle 100 display the mentioned information on a dashboard. It has then proven to be a disadvantage that during an inspection of the vehicle or monitoring in the context of a fleet of vehicles, handwritten notation of the mentioned vehicle information is required each time. In order to overcome this drawback, it is proposed according to the invention that the mobile identification transmitter 10 has an electronic unit 11 and the electronic unit 11 is used for data communication 30 with a vehicle part. The flow of vehicle information can occur, on the one hand, by direct data connection 30 between the mobile ID transmitter 10 and the vehicle part. For example, the ABS system can send its settings directly to the mobile identification transmitter 10. As an alternative, it is also possible that the vehicle information is first fed by means of a bus system to a central computer of the vehicle 100 and from there goes to the mobile ID transmitter 10 via the data communication 30. Regardless of whether direct or indirect data communication 30 is chosen, the mobile ID transmitter 10 stores the vehicle information in the data memory.

Figure 2:
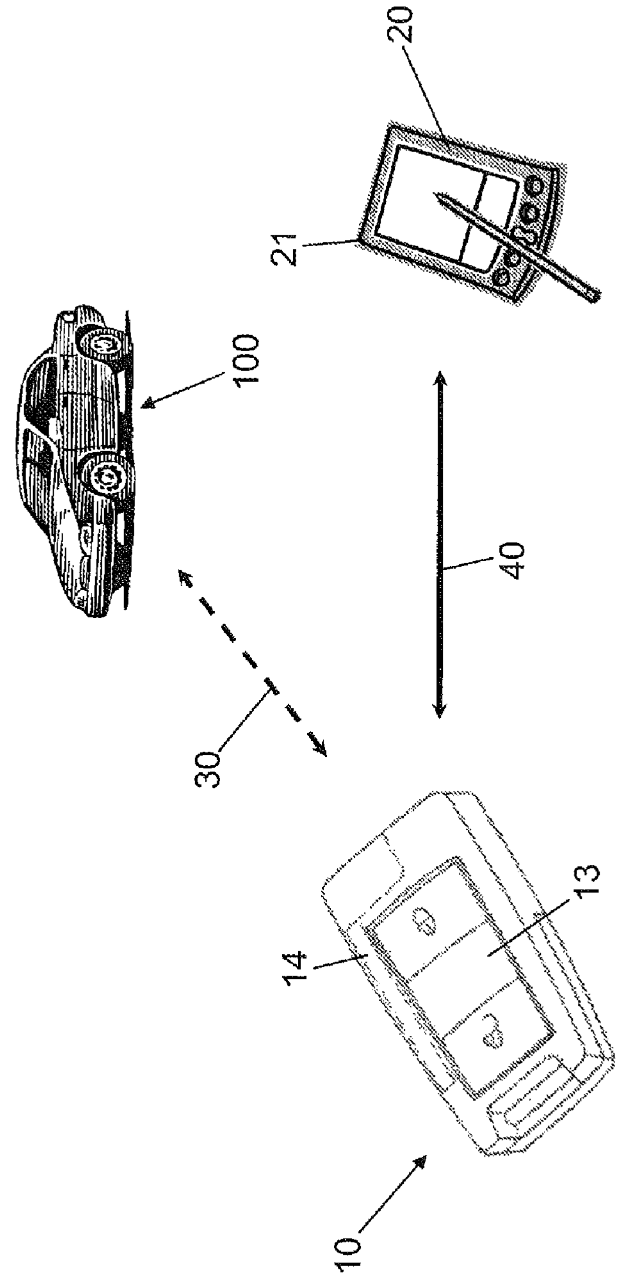
FIG. 2 shows the mobile identification transmitter according to the invention in communication connection with an independent display unit and FIG. 3 shows the mobile identification transmitter in communication connection with a number of display units.

As shown in FIG. 2, it is possible, with the mobile ID transmitter 10 according to the invention, to communicate with an independent display unit 20 via communication connection 40. The vehicle information is transmitted via this communication connection 40 from the data memory of the mobile ID transmitter 10 to the independent display unit 20. The vehicle information is then displayed on the independent display unit 20. The method according to the invention, as well as the mobile ID transmitter 10 according to the invention, consequently combine the possibility of transmitting the vehicle information transmitted from vehicle 100 to an independent display unit 20 not connected to the aforementioned mobile ID transmitter 10. In particular, it is proposed according to the invention that any independent display units 20 can be used Setup of drivers, in order to read out the information, is not required. However, it has proven advantageous to start a computer program on the independent display unit 20, which permits convenient display of the vehicle information for the user.

The starting point for the communication connection 40 between the mobile ID transmitter 10 and the display unit 20 is a query sequence. This is sent in one variant of the method according to the invention from the mobile ID transmitter 10. The display unit 20, which receives the query sequence, can answer with a response sequence to set up the communication connection 40. Such ad hoc communication connections 40 can be implemented, for example, by using Bluetooth interfaces. In addition, in the context of the response sequence, a transmission format for the vehicle information can be transmitted. The electronic unit 11 of the mobile ID transmitter 10 can adapt the vehicle information so that the display unit 20 can receive and display this information without a problem. The mobile ID transmitter 10 preferably sends a query sequence that informs the display unit 20 that a data memory would like to communicate with it. Such data memories are widely used nowadays, so that no pre-installation of additional drivers on the display unit 20 is required, in order to permit communication connection 40.

To set up the communication connection 40, the mobile ID transmitter 10 has a communication device 14. This communication device 14 is a transmitting/receiving unit integrated in the housing of the mobile ID transmitter 10. The independent display unit 20 also has a communication element 21, which is also designed as a transmitting/receiving unit. Through wireless transmission of electromagnetic waves between the communication device 14 and the communication element 21, the communication connection 40 is made and the vehicle information exchanged.

Figure 3:
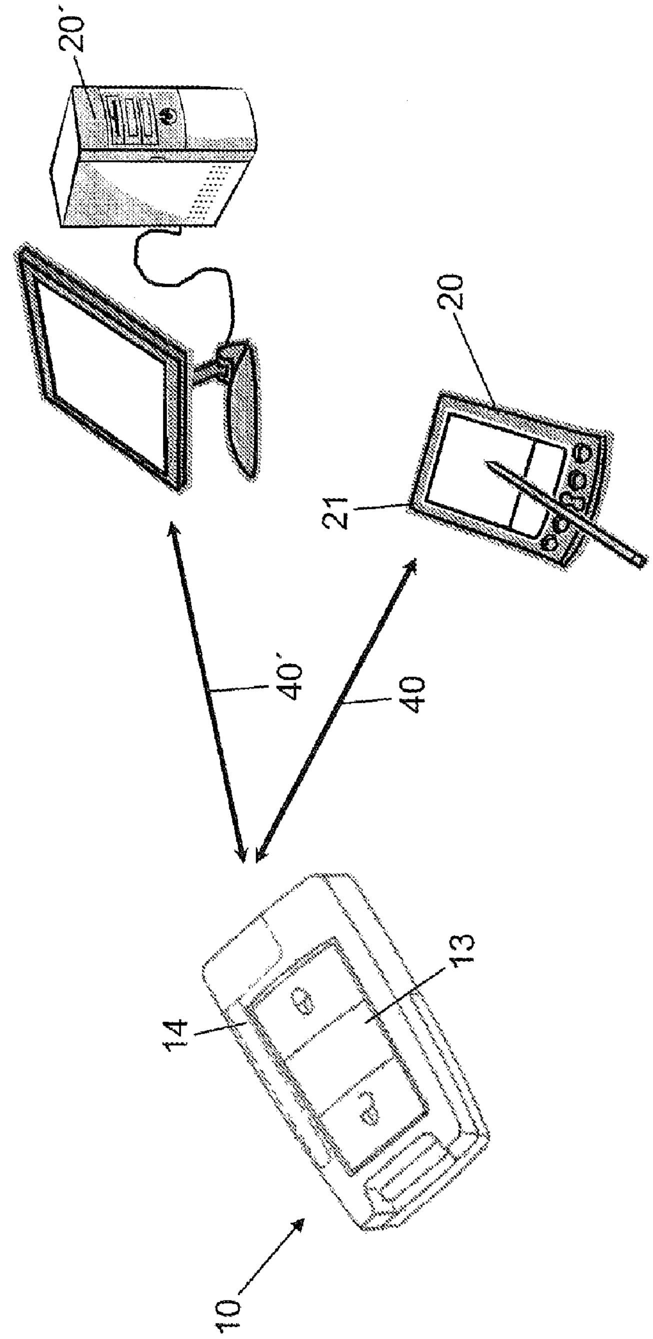

Another variant of the mobile ID transmitter 10 according to the invention is shown in FIG. 3. The mobile ID transmitter 10 has an activation element 13, on which the query sequence can be triggered. If a user activates the activation element 13, a communication device 14 sends the query sequence to the display unit 20. This receives the query sequence, processes it and, in turn, sends a response sequence via the communication element 21. It is proposed according to the invention that the mobile ID transmitter 10 can communicate with a number of independent display units 20, 20'. As shown in FIG. 3, the mobile ID transmitter 10 can produce a communication connection 40 to the independent display unit 20. Parallel with or sequential to it, it is also possible to make a second communication connection 40' with a second independent display unit 20'. In the context of these communication connections 40, 40', the type of independent display unit 20, 20' can be transmitted to the mobile ID transmitter 10. There is consequently a possibility for the latter to decide, by means of a priority list, with which of the determined display units 20 the method according to the invention is to be executed.

It is therefore possible for a user of a vehicle to use any display unit 20, 20' at any location, in order to call up the stored information by the mobile ID transmitter 10 and have it displayed on display unit 20, 20'. An overview of the different vehicle parameters could be produced at any time. It should be kept in mind, in particular, that no prior transmission of additional computer programs to display unit 20, 20' is required. Instead, available interfaces are used, which have generic drivers and can thus be used at any time for data transmission. It is ensured on this account that the mobile ID transmitter 10 can communicate with any display unit 20. Display of information can then occur through a known word editor and requires no additional software. It is also conceivable that the mobile ID transmitter 10 is recognized by the display unit 20, 20' as a data memory. Such types of data memories are widespread nowadays and are independently recognized without a problem by most EDP units with the connected display unit 20, 20'. The method according to the invention, combined with the mobile ID transmitter 10 according to the invention, consequently permits communication at any time with any display unit 20, 20' and display of the vehicle information.

The invention claimed is:

1. A method for displaying vehicle information, comprising:

receiving, by a mobile identification transmitter, the vehicle information via a data communication from a vehicle; and transmitting, by an electronic unit of the mobile identification transmitter, the vehicle information via a communication connection to an independent display unit to cause the display of the vehicle information on the independent display unit, the transmitting comprises:

receiving a triggering command via an activation element of the mobile identification transmitter, sending, by the mobile identification transmitter, a query sequence to a plurality of display units in response to the triggering command, wherein the independent display unit is one of the plurality of display units, and selecting, by the mobile identification transmitter, the independent display unit from the plurality of display units via a priority list in response to the receiving of a plurality of sequence, receiving, by the mobile identification transmitter, a response sequence from the independent display unit, the response sequence identifying information to establish the communication connection between the mobile identification transmitter and the independent display unit, the response sequence identifying a transmission format for the vehicle information, transmitting, by the mobile identification transmitter, the vehicle information to the independent display unit, wherein the independent display unit selects a first transmission format as the transmission format and transmits the first transmission format in the response sequence to the mobile identification transmitter, wherein the mobile identification transmitter adapts the vehicle information to the first transmission format.

2. The method of claim 1, further comprising:

storing the vehicle information in a data memory of the mobile identification transmitter.

3. The method of claim 1, wherein the transmitting of the vehicle information further comprises:

receiving, by the mobile identification transmitter, the plurality of sequences, each sequence corresponding to one of the plurality of display units, and transmitting, by the mobile identification transmitter, the vehicle information to the independent display unit in response to the selecting of the independent display unit.

4. The method of claim 1, wherein the transmitting of the vehicle information further comprises:

receiving, by the mobile identification transmitter, the query sequence from the independent display, and sending, by the mobile identification transmitter, the response sequence to the independent display unit.

5. The method of claim 1, wherein the display of the vehicle information on the independent display unit further comprises:

displaying a state of the vehicle in accordance with the vehicle information, wherein the state comprises a mileage of the vehicle, a tank content, a maintenance interval or a content of an error memory.

6. The method of claim 1, wherein the receiving of the vehicle information via the data communication further comprises:

receiving, by the mobile identification transmitter, a variety of vehicle information via the data communication to the electronic unit of the mobile identification transmitter from a plurality of vehicle parts, and transmitting different information from the variety of vehicle information via the communication connection based on a type of independent display unit.

7. The method of claim 1, wherein the independent display unit processes the vehicle information to compare the vehicle information with a reference value, the reference value comprising a reference interval, wherein the independent display unit displays a warning signal when the vehicle information is outside of the reference interval.

8. The method of claim 1, further comprising:

receiving, by the mobile identification transmitter, an information sequence from the independent display unit; and transmitting, by the mobile identification transmitter, the information sequence to a data processing system of the vehicle.

9. The method of claim 8, wherein the information sequence causes the processing of the vehicle information in the data processing system of the vehicle before receipt by the mobile identification transmitter.

10. A non-transitory computer program product, the computer program product comprising a computer readable storage medium having program instructions embodied therewith, the program instructions executable by a processor to cause the processor to perform the method according to claim 1.

11. The method of claim 1, wherein the vehicle information is stored in a data memory of the mobile identification transmitter, and the vehicle information is transmitted via the communication connection from the data memory of the mobile identification transmitter to the independent display unit.

12. The method of claim 1, wherein the transmission of the transmission format by the independent display unit to the mobile identification transmitter causes the electronic unit of the mobile identification transmitter to adapt the vehicle information to enable the independent display unit can receive and display this vehicle information.

13. The method of claim 1, wherein the vehicle information is information occurring in the vehicle, wherein the vehicle information is stored in the mobile identification transmitter, wherein, in response to the vehicle information being stored, the vehicle information is transmitted by the mobile identification transmitter to the independent display unit, and wherein the independent display unit is not part of the mobile identification transmitter.

14. A system for displaying vehicle information, comprising:

a mobile identification transmitter configured to receive the vehicle information via a data communication from a vehicle; and an electronic unit of the mobile identification transmitter configured to transmit the vehicle information via a communication connection to an independent display unit to cause the display of the vehicle information on the independent display unit, wherein with respect to the transmission of the vehicle information, the mobile identification transmitter is configured to:

receive a triggering command via an activation element of the mobile identification transmitter, send a query sequence to a plurality of display units in response to the triggering command, wherein the independent display unit is one of the plurality of display units, and select the independent display unit from the plurality of display units via a priority list in response to a receipt of a plurality of sequences, receive a response sequence from the independent display unit, wherein the response sequence identifies information to establish the communication connection between the mobile identification transmitter and the independent display unit, wherein the response sequence identifies a transmission format for the vehicle information, transmitting, by the mobile identification transmitter, the vehicle information to the independent display unit, wherein the independent display unit selects a first transmission format as the transmission format and transmits the first transmission format in the response sequence to the mobile identification transmitter, wherein the mobile identification transmitter adapts the vehicle information to the first transmission format.

15. The system of claim 14, wherein a data memory of the mobile identification transmitter is configured to store the vehicle information.

16. The system of claim 14, wherein with respect to the transmission of the vehicle information, the mobile identification transmitter is configured to:

receive the plurality of sequences, wherein each sequence corresponds to one of the plurality of display units, and select a display unit from the plurality of display units via a priority list in response to the receipt of the plurality of sequences, and transmit the vehicle information to the display unit in response to the selection of the display unit.

17. The system of claim 14, wherein with respect to the transmission of the vehicle information, the mobile identification transmitter is configured to:

receive the query sequence from the independent display, and send the response sequence to the independent display unit.

18. The system of claim 14, wherein the display of the vehicle information on the independent display unit comprises a display of a state of the vehicle in accordance with the vehicle information, wherein the state comprises a mileage of the vehicle, a tank content, a maintenance interval or a content of an error memory.

19. The system of claim 14, wherein with respect to the receipt of the vehicle information via the data communication from the vehicle, the mobile identification transmitter is configured to:

receive, at an electronic unit of the mobile identification transmitter, a variety of vehicle information via the data communication from a plurality of vehicle parts, and transmit different information from the variety of vehicle information via the communication connection based on a type of independent display unit.

20. The system of claim 14, wherein the independent display unit is configured to process the vehicle information to compare the vehicle information with a reference value, the reference value comprising a reference interval, and display a warning signal when the vehicle information is outside of the reference interval.

21. The system of claim 14, wherein the mobile identification transmitter is further configured to:

receive an information sequence from the independent display unit; and transmit the information sequence to a data processing system of the vehicle.

22. The system of claim 21, wherein the information sequence causes the processing of the vehicle information in the data processing system of the vehicle before receipt by the mobile identification transmitter.

23. A mobile identification transmitter for a security system, comprising an electronic unit and a data memory, configured to:

receive the vehicle information via a data communication from a vehicle; and transmit, via the electronic unit, the vehicle information via a communication connection to an independent display unit to cause the display of the vehicle information on the independent display unit, wherein with respect to the transmission of the vehicle information, the mobile identification transmitter is configured to:

receive a triggering command via an activation element of the mobile identification transmitter, send a query sequence to a plurality of display units in response to the triggering command, wherein the independent display unit is one of the plurality of display units, and select the independent display unit from the plurality of display units via a priority list in response to a receipt of a plurality of sequences, receive a response sequence from the independent display unit, wherein the response sequence identifies information to establish the communication connection between the mobile identification transmitter and the independent display unit, wherein the response sequence identifies a transmission format for the vehicle information, transmitting, by the mobile identification transmitter, the vehicle information to the independent display unit, wherein the independent display unit selects a first transmission format as the transmission format and transmits the first transmission format in the response sequence to the mobile identification transmitter, wherein the mobile identification transmitter adapts the vehicle information to the first transmission format.

* * * * *